United States Patent [19]

Jenkin

[11] Patent Number: 5,130,204
[45] Date of Patent: Jul. 14, 1992

[54] RANDOMLY DISPERSED METAL FIBER MAT

[76] Inventor: William C. Jenkin, 382 Dorchester Rd., Akron, Ohio 44320

[21] Appl. No.: 154,797

[22] Filed: Feb. 11, 1988

[51] Int. Cl.$^5$ .......................... C22C 1/09; B22F 9/30; C22B 5/20
[52] U.S. Cl. .................................................. 428/605
[58] Field of Search .............................. 428/606, 605

[56] References Cited

U.S. PATENT DOCUMENTS

| | | | |
|---|---|---|---|
| 1,759,661 | 5/1930 | Muller et al. | 75/251 |
| 1,836,732 | 12/1931 | Schlecht et al. | 75/0.5 AB |
| 2,726,951 | 12/1955 | Ramsay et al. | 75/0.5 AA |
| 2,884,319 | 4/1959 | Fabian et al. | 75/251 |
| 3,087,233 | 4/1963 | Turnbulc | 428/605 |
| 3,243,173 | 3/1966 | Nichols | 266/186 |
| 3,406,025 | 10/1968 | Hamling | 428/605 |
| 3,409,281 | 11/1968 | O'Neill et al. | 266/141 |
| 3,570,829 | 3/1971 | Schaditz | 75/0.5 A |
| 3,705,021 | 12/1972 | Sundberg et al. | 428/605 |
| 3,713,787 | 1/1973 | Kuniyasu et al. | 428/605 |
| 3,902,865 | 9/1975 | Leavenworth et al. | 428/605 |
| 3,955,962 | 5/1976 | Dawihl et al. | 75/0.5 AA |
| 4,066,450 | 1/1978 | Takeuchi et al. | 428/605 |

FOREIGN PATENT DOCUMENTS

| 821690 | 10/1959 | United Kingdom | 428/605 |
|---|---|---|---|

OTHER PUBLICATIONS

C. L. Korbrin, The Iron Age, "Fiber Metals: A New Adventure in Engineering Materials", Jan. 24, 1963, pp. 53-55.

R. Read, "Fiber Metallurgy: A Progress Report", Materials in Design Engineering, Dec. 1959, pp. 104-106.

A. G. Metcalfe et al., "Fiber Metallurgy", Metal Progress, Mar. 1955, pp. 81-84.

*Primary Examiner*—John Zimmerman
*Attorney, Agent, or Firm*—Fay, Sharpe, Beall, Fagan, Minnich & McKee

[57] ABSTRACT

The present invention relates to a method of continuously producing metal fibers, which comprises the steps of providing a plurality of nucleation sites of metal by injecting a stream of gaseous metal carbonyl into a reaction chamber through a first port means while injecting a stream of an inert gas, at a temperature of at least 425° F., into said reaction chamber through a second port means, said first and second port means being positioned to promote mixing of said metal carbonyl and said inert gas as they enter said reaction chamber whereby partial pyrolysis of the metal carbonyl is effected to provide nucleation sites of the metal; subjecting said metal at said nucleation sites to a source of radiant heat while still is in said reaction chamber, to effect further metal carbonyl pyrolysis whereby fibers of the metal are caused to grow so as to have a diameter of at least 0.5 micron, and a length to diameter ratio of at least 10:1; and continuously removing said metal fibers from said reaction chamber. The present invention also concerns novel metal fibers and provides a novel random mat of metal fibers having a void volume of over 90% which can be employed to produce a number of unique new products.

8 Claims, 1 Drawing Sheet

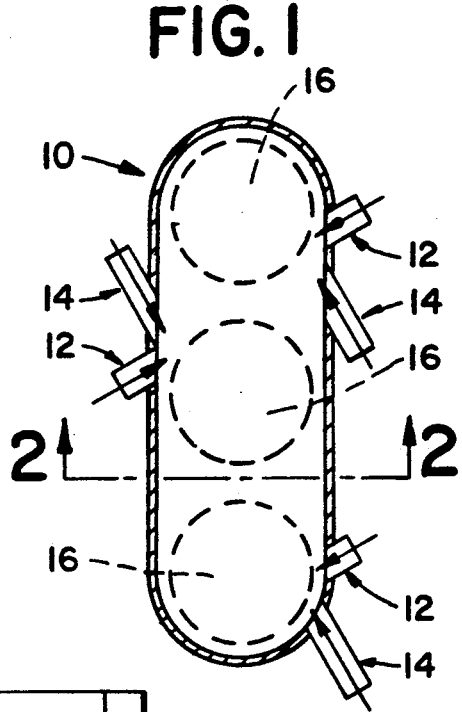
FIG. 1
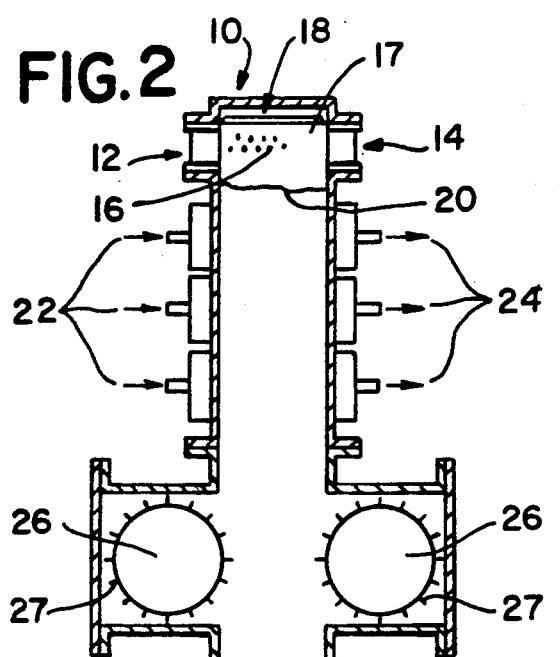
FIG. 2
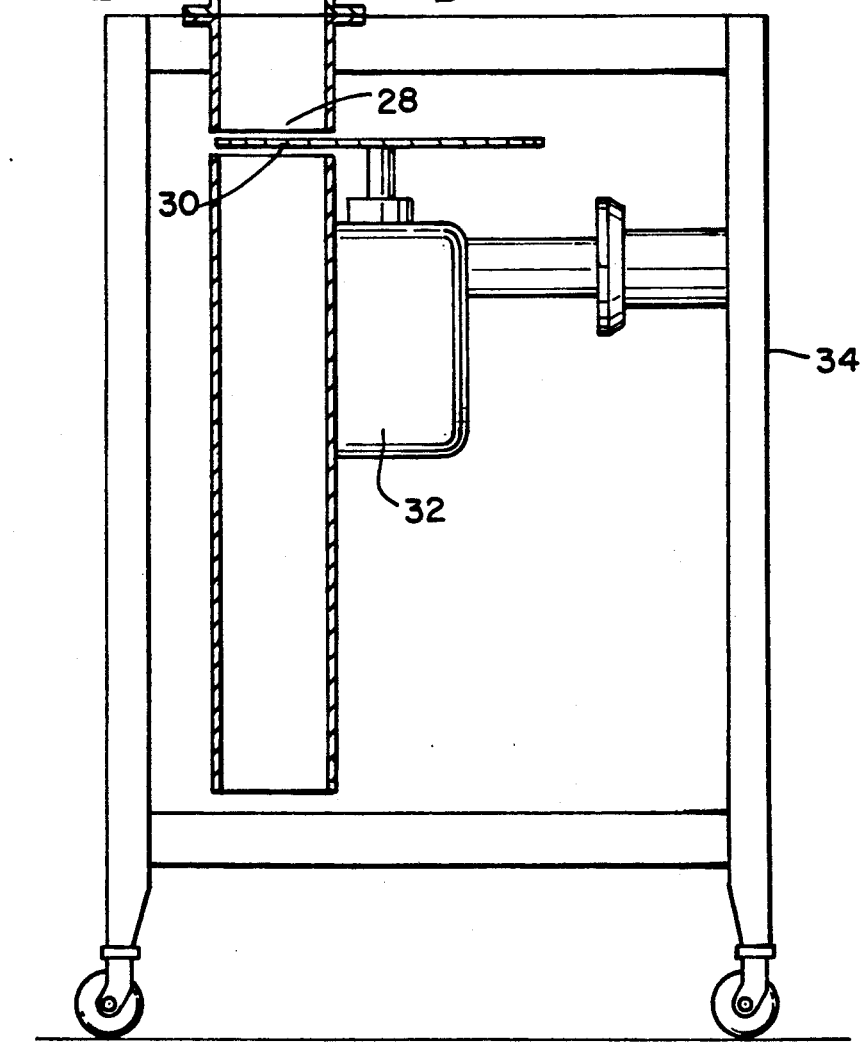

RANDOMLY DISPERSED METAL FIBER MAT

BACKGROUND OF THE INVENTION

The present invention relates to the production of metal fibers and more particularly to a method of continuously producing elongated fibers of metal by pyrolysis of the corresponding metal carbonyl. It has long been known that a number of metal carbonyls can be pyrolized in a suitable reaction chamber using a variety of specific techniques to provide as one of the dissociation products fibers of the metal which can be collected and employed in a wide variety of end use applications. In particular, the pyrolysis of nickel carbonyl has long been used as a means to produce nickel metal in a powdered or very short fibrous form.

U.S. Pat. No. 1,759,661 to Muller, et al. discloses the concept of mixing a metal carbonyl with an inert gas or vapor that has been preheated, in order to form spongy metal flakes. The carbonyl is decomposed in the free space in the apparatus to produce dense, spongy flakes. The walls of the apparatus provide heat to the free space to cause the carbonyl to decompose.

U.S. Pat. No. 2,726,951 to Ramsay, et al., produces metal fibers by injecting a metal carbonyl through six nozzles in a header attached to the top of a decomposition column. The fibers are produced by decomposition in a special apparatus and hot flue gasses are utilized to heat the apparatus and thereby cause the carbonyl to decompose.

U.S. Pat. No. 2,884,319 to Fabian et al. employs an inert gas thoroughly mixed with nickel carbonyl to form what are described as elongated nickel particles. The carbonyl is decomposed by means of heat generated by a heating element which is contained in a tube. The tube radiates heat which causes the decomposition to occur. The decomposition takes place in a magnetic field.

In U.S. Pat. No. 3,955,962 to Dawihl, et al. fibers are produced in a magnetic field in an apparatus having heated walls and then withdrawn from the chamber of the apparatus by means of pistons. The piston has a wire mesh face on which metal fibers are grown. A variable motor moves the piston and the velocity of the piston movement corresponds to the growing velocity of the fibers. Schladitz, U.S. Pat. No. 3,570,829 also uses a plunger to remove nickel fibers from the surface on which they grown in the chamber. As in Dawihl, the fibers are formed in a magnetic field and removed from the apparatus by means of a plunger. A heated surface is used to provide the energy to decompose the carbonyl.

Lambert, et al. U.S. Pat. No. 2,604,442 employs ultraviolet radiation to quicken the reaction that produces metal particles from a metal carbonyl. Small metal particles are formed by pre-decomposing the carbonyl by means of an ultraviolet heat source. It should be noted that Lambert, et al. uses ultraviolet but not infrared heat to decompose carbonyl, and in a portion of the apparatus which is exterior to the main reaction chamber.

There are a number of patents, including O'Neill et al. U.S. Pat. No. 3,409,281, Nichols, U.S. Pat. No. 3,243,173 and Schlecht, et al. U.S. Pat. No. 1,836,732 which disclose some form of recirculation of the heating gas having particles entrained therein back to the top of the reaction chamber. In particular, Nichols teaches that the fine particles are continuously recirculated back into the reaction zone until they reach sufficient size to drop into the lower chamber.

From the foregoing, it will be clear that pyrolysis of nickel carbonyl has long been used as a route to produce nickel powders, and extension work has been done to improve the process of producing nickel metal by pyrolysis of nickel carbonyl. All these prior art methods, however, tended to produce either powdery deposits of nickel or deposits of relatively short metal fibers having length to diameter ratios from the range of about 4 or 5:1 and rarely in excess of 10:1.

It has long been desired to produce mats or "biscuits" of random interlayered relatively long metal fibers, having a diameter of at least 0.5 micron and wherein the bulk of the metal deposit is made up of fibers having a length to diameter ratio in excess of 10:1. Such biscuits would have a number of potentially advantageous end uses, particularly as battery and fuel cell electrodes, in the fabrication of conductive polymer composites, filter elements, coatings for microwave absorption, conductive paints, conductive adhesives, conductive gaskets, and high temperature insulators.

SUMMARY OF THE INVENTION

The present invention provides a method of continuously producing metal fibers, having a diameter of at least 0.5 micron and a length to diameter ratio of at least 10:1. The process of the present invention comprises: providing a plurality of nucleation sites of the metal by injecting a stream of gaseous metal carbonyl into a reaction chamber through a first port means while injecting a stream of an inert gas, at a temperature of at least 425° F., into said reaction chamber through a second port means, said first and second port means being positioned to promote mixing of said metal carbonyl and said inert gas as they enter said reaction chamber whereby partial pyrolysis of the metal carbonyl is effected to provide nucleation sites of the metal; then subjecting said metal at said nucleation sites to a source of radiant heat while still is in said reaction chamber, to effect further metal carbonyl pyrolysis whereby fibers of the metal are caused to grow so as to have a diameter of at least 0.5 micron, and a length to diameter ratio of at least 10:1; and then continuously removing said metal fibers from said reaction chamber.

In the method of the present invention as the metal fibers are formed, they tend to form a column of random fiber mat having at least 90% void space and a density of less than 0.2 gm/cm$^3$ that extends across substantially the entire cross section of the reaction chamber. This column is caused to move downward through the reaction chamber by any suitable means until it reaches a point at the extremity of the reaction chamber where it exits the chamber and where it can be cut into individual biscuits or slabs for subsequent further treatment into a desired configuration or end use.

THE DRAWINGS

In the drawings,

FIG. 1 is a top view of one apparatus useful in practicing the process of the present invention.

FIG. 2 is a cross sectional side view of the apparatus of FIG. 1 along the lines 2—2 of FIG. 1.

PREFERRED EMBODIMENT

In the preferred embodiment of the present invention, nickel carbonyl is warmed to a temperature of about 200° F. and injected into a reaction chamber through a first port means while injecting a stream of an inert gas at a temperature of at least 425° F. into said reaction chamber through a second port means For purposes of the present invention the term 'inert' shall be understood to mean any element or compound or mixture of elements and/or compounds in the gaseous state which will not itself react with nickel carbonyl or its dissociation products.

The preferred assembly for continuously moving the nickel metal fibers from the reaction chamber consists of suitable means to engage the column of nickel fibers and propel it downwardly away from the reaction chamber at a speed essentially equal to the speed at which the nickel fibers are being formed in the continuous reaction. Since the speed at which the fibers are formed may vary according to the amount of nickel carbonyl injected into the reaction chamber, and the efficiency of the overall pyrolysis reaction, it is desirable that the aforesaid means for engaging the column of nickel metal be provided with adjusting means to facilitate adjustment of the speed as the rate of formation of nickel metal fibers increases or decreases.

A particularly suitable apparatus for conducting the process of the present invention is illustrated by FIG. 1 and 2. Reaction chamber (10) has a plurality of first input means (12) through which the warm nickel carbonyl is injected into the reaction chamber (17), and a plurality of second port means (14) through which hot inert gases are injected into the chamber, respective port means (12) and (14) being suitably positioned to effect mixing of the gases as they are injected into the reaction chamber, whereby partial pyrolysis of the nickel carbonyl is effected creating a plurality of nucleation sites of nickel metal generally illustrated by (16). Radiator (18) heats the nucleated particles, which effects further pyrolysis of undissociated nickel carbonyl, whereby the nucleated particles grow and settle and form elongated fibers which agglomerate to form a column composed of a mat of randomly interwoven fibers of nickel metal (20). The column (20) is moved downwardly through the reaction chamber by transfer means (26) a pair of opposed rotating drums having a plurality of projections (27) which engage the outside edge of column (20) causing it to move downwardly through the reaction chamber to exist ports (28). At or below exit port (28) column (20) is cut into individual biscuits employing cutting means (30), a saw blade operated through drive means (32). The assembly of FIGS. 1 and 2 is adapted to be mounted on an airtight box-like enclosure (34) or other suitable support means. As illustrated in FIG. 2, the apparatus is optionally provided with a plurality of flushing ports (22) and also a plurality of exhaust ports (24) through which suitable flushing gases can be passed through the column, and the gaseous dissociation products of pyrolysis reaction and any undissociated nickel carbonyl can be recovered. Any unpyrolized nickel carbonyl can be enriched for recycle to the reactor and/or under suitable circumstances directly recycled to the reactor.

Experiments were conducted employing a reactor similar to that described above. A stream of 800 ml per minute of nickel carbonyl at a temperature of 200° F. and a stream of from 800 to 1180 ml per minute of carbon dioxide were fed to the reaction chamber through input means set at a 90° angle to each other, causing immediate intimate mixing of the gases within the reaction chamber. The nucleant particles formed by the mixing of the two gasses were irradiated by a porous metal electrically heated radiator and elongated fibers of nickel metal were continuously deposited forming a mat of randomly interwoven nickel fibers which continued to grow at a rate of approximately 15 inches per hour. The column of the mat of nickel fibers was moved downwardly through the reactor and formed into biscuits approximately 6 ¼ inches in diameter by 2 inches thick.

Sample biscuits were examined and were found to weigh approximately 16 to 25 grams and under microscopic examination showed a continuous mass of intermeshed fibers ranging in diameter from 0.7 micron up to 5.0 microns. The diameter varies to some extent with reaction conditions in a particular experiment. While some fibers were longer than others, the average length to diameter ratio of the fibers was generally in excess of 30:1. These mats were found to have void volumes of over 99%, which makes them particularly suitable for porous structures such as battery and fuel cell electrodes, filter elements and high temperature insulators. Other sample fibers mats were impregnated with epoxy resin to yield conductive composites measuring bulk resitivities well below 1.0 ohm/cm. The mats can also be easily broken down into individual fibers for mixing into paints and plastics. Samples of conductive paints and plastics were produced with outstanding electrical properties.

A series of experiments were conducted employing apparatus similar to that described in FIG. 1 to pyrolize nickel carbonyl and produce nickel fibers. The general conditions were maintained as uniform as possible except as noted in specific examples where changes were made to measure the effect of particular variables. Unless otherwise noted, the radiator was maintained at 725° F., the chamber itself at 280° F., the inert gas preheater at from 400° to 700° F., the carbonyl-CO mix preheater at an average of 210° F. Likewise, unless otherwise noted, the carbon monoxide addition to the carbonyl was usually maintained at 300 ml per minute (though it was run as low as 50 ml/min) and the carbonyl vapor (calculated at room temperature) was 800 ml per minute.

The following examples will serve by way of illustration and not by way of limitation to describe the novel method of the present invention and the manner in which the novel metal mat of the present invention is produced.

EXAMPLE I

A 20 minute run was conducted using the standard conditions set forth above with a stream of 800 ml per minute of nickel carbonyl and a flow of 800 ml per minute of carbon dioxide into the chamber. 18.7 grams of nickel fiber were collected on the screen and a total fiber production of 22.9 grams was obtained. The density of the nickel fiber mat was measured at 0.09 gm/cm$^3$.

EXAMPLE II

The experiment of Example I was repeated except that the carbon dioxide flow into the chamber was increased to 1050 ml per minute. Again, after a 20 minute run, 17.8 grams of fiber were measured on the screen and a total fiber production of 19.8 grams was observed. The mat was much bulkier than in Example I, having a much lower density, measured at 0.017 gm/cm$^3$.

EXAMPLE III

A further experiment was conducted as set forth in Example I, except that the carbon dioxide flow was maintained at 925 ml per minute. In this experiment 19.5 grams of fibers were found on the screen. A total of nickel fiber production of 25.0 grams was observed and the nickel fiber mat had a density of 0.065 gm/cm$^3$.

EXAMPLE IV

As a check on reproducibility, the experiment of Example III was repeated. At the end of the experiment 20.3 grams of nickel fiber were found on the screen. 25.5 grams of total nickel fiber production was measured and the nickel mat had a density of 0.06 gm/cm$^3$.

EXAMPLE V

A further experiment was conducted similar to Example I except that the carbon dioxide flow was 1000 ml per minute. 24.4 grams of fiber were found on the screen, 28.5 grams of fiber were produced overall and the nickel fiber mat had a density of 0.046 gm/cm$^3$.

From the foregoing it will be apparent that adjustment of the flow of inert gas and carbonyl into the reaction chamber has a direct impact on the density of the nickel fiber mat produced. In general for the end use applications presently contemplated for the product of the present invention, a density in the range of about 0.003 to about 0.1, preferably 0.02 to 0.05 gm/cm$^3$ is desirable. While the mat product of Example II having a density of 0.017 gm/cm$^3$ is below this, and the mat products of Examples I, III and V having densities of 0.09, 0.65, and 0.06 gm/cm$^3$ respectively are higher than the foregoing optimum range, they do represent acceptable product, which could indeed have optimum properties for alternative end use applications.

After a long series of experiments it was found that superior results were generally obtained using 1180 ml/min of CO$_2$, 800 ml/min of carbonyl vapor, 300 ml/min of CO, a preheated temperature of 525° F. and a radiator temperature of 725° F.

A further series of experiments were conducted in which nickel carbonyl was pyrolized in an effort to evaluate different inert or "nucleant" gases, in particular, carbon dioxide, steam, heptane and carbon monoxide. Heptane may be considered exemplative of suitable organic vapors, i.e. organic compounds which are gaseous at the operating temperature of the process, inert with respect to the carbonyl, and which absorb infrared radiation of between 3 and 7 microns in wavelength.

It should be noted that while these experiments where by no means exhaustive, and it was not possible to optimize conditions for each of the gases, the experiments did establish that each of the gases can be employed, and some comparative comments with regard to the four specific gases of this experiments are set forth in Table I.

TABLE I

| | COMPARISON OF NUCLEANT GASES | | | |
|---|---|---|---|---|
| | CARBON DIOXIDE | STEAM | HEPTANE | CARBON MONOXIDE |
| Typical nucleant gas temperature | 525° F.: higher didn't seem to help | 700° F. | 700° F. | 525–600° F. |
| Density of biscuit | high and low .015 to .046 g/cm$^3$ | low .01 .02 g/cm$^3$ | low produced so far .01 g/cm$^3$ | very dense |
| Blocking of nozzles | low | low | high | much collects on top of nozzles |
| Fiber accumulation on radiator | low | very low | significant | low |
| Deposition on radiator | 0.5 g per run | nil | nil | heavy; 1 g per run |
| Yield per run | 20 g + (20 min. run) (20 min. run) | 11 g typical (15 min. run) | 11 g typical (15 min. run) | 13–17 g (20 min) |
| Effect on recovery cycle | Requires refrigeration compressor to separate CO and CO$_2$ | water is easily condensed to separate from CO. Is immiscible with carbonyl and separable by draining. | Easily condenses to separate from Co. Is miscible with carbonyl and some carbonyl may condense with the heptane. | No separation is required. |

A still further series of further experiments were conducted to produce iron fibers. These experiments were also conducted using the apparatus similar to that of FIG. 1, the particulars for Examples 6 through 11 as set forth in Table II. For each of the experiments, three temperatures are set forth, the upper most being the temperature of the inert gas, the middle temperature that of the carbonyl vapor, and the lower temperature, the temperature of the radiator.

TABLE II

| | | | | IRON FIBER RUNS | | | | | |
|---|---|---|---|---|---|---|---|---|---|
| HEATED NUCLEANT GAS | TEMPER- ATURES | FLOW OF HEATED GAS | TIME: MIN- UTES | CO ADDED TO CARBONYL | WEIGHT OF FIBER | CONDITION OF FIBER | POWDERY OR NOT | HEIGHT OF BISCUIT | SCREEN AD- HESION |
| Hydrogen | 600° F. 250° F. 725° F. | 1700 ml/min. | 15 | 75 ml per min. | 4.0 g | straggly | yes | irregular | none |
| Hydrogen | 700° F. 250° F. 725° F. | 1400 ml/min. | 15 | 75 ml per min. | 5.1 g | cylindrical biscuit | no | above nozzles | none |
| Hydrogen | 800° F. 250° F. 725° F. | 1400 ml/min. | 15 | 75 ml per min. | 5.3 g | cylindrical biscuit BIGGEST | very slightly | above nozzles | none |
| Hydrogen | 700° F. 250° F. | 1400 ml/min. | 10 | 30 ml per min. | 3.6 g | cylindrical biscuit | no | above nozzles | none |

TABLE II-continued

IRON FIBER RUNS

| HEATED NUCLEANT GAS | TEMPERATURES | FLOW OF HEATED GAS | TIME: MINUTES | CO ADDED TO CARBONYL | WEIGHT OF FIBER | CONDITION OF FIBER | POWDERY OR NOT | HEIGHT OF BISCUIT | SCREEN ADHESION |
|---|---|---|---|---|---|---|---|---|---|
| Hydrogen | 725° F. 700° F. 250° F. 725° F. | 1200 ml/min. | 10 | 30 ml per min. | 3.4 g | ball | no | came loose and balled up | none |
| $CO_2$ | 725° F. 650° F. 250° F. 725° F. | 1200 ml/min. | 10 | 30 ml per min. | 5.5 g | slightly ragged cylindrical biscuit | yes | above nozzles | sticks |

It will, of course, be understood that the specific elements which were employed in constructing the apparatus of FIGS. 1 and 2 are not generally regarded as in any way critical to the present invention though the overall combination of apparatus elements is considered to be novel. The most critical elements of the present invention appear to be partial pyrolysis of nickel carbonyl to form a plurality of nucleant nickel particles which are then subjected to radiant heat in situ causing them to effect further pyrolysis of the undissociated nickel carbonyl, whereby the nucleant particles grow forming large elongated nickel fibers. Also, while the nickel particles have been described in terms of being elongated fibers and having a length to diameter ratio in excess of about 10:1 to 20:1 or more, it will be understood that this refers to the principal axis of the fiber, which may have a tree like configuration with a plurality of additional fiber growth projecting from it.

Fiber mat sheets can be formed by compressing sheets of fiber mat to the desired thickness for products such as electrodes (thickness e.g. 30 to 60 mils) during the annealing process. The thin fiber sheets can then be cut to size for the specific electrode or other application. A similar approach would be used to fabricate filter elements.

Conductive polymer composites can be formed by impregnating fiber sheets, for use in producing conductive gaskets and thermoformable conductive sheets. Also, impregnated plastic sheets can be diced to form pellets for injection molding conductive plastic composite components.

It is apparent that there has been provided in accordance with this invention a process and apparatus for producing metal fibers which fully satisfies the objects, means and advantages set forth hereinbefore. While the invention has been described in combination with the specific embodiments thereof, it will be evident that many alternatives, modifications, and variations will be apparent to those skilled in the art in light of the foregoing description. Accordingly, it is intended to embrace all such alternatives, modifications and variations as fall within the spirit and scope of the appended claims.

I claim:

1. A mat of randomly disposed metal fibers having a density of from about 0.003 to about 0.1 gm/cm$^3$ said fibers having a diameter of from about 0.5 micron to about 5.0 microns, and a length to diameter ratio of at least 10:1.

2. The mat of claim 1 wherein said metal fibers are nickel.

3. The mat of claim 1 wherein said metal fibers are iron.

4. The mat of claim 1 wherein said metal fibers have an average length to diameter ratio of at least 30:1.

5. The mat of claim 2 wherein said metal fibers have an average length to diameter ratio of at least 30:1.

6. The mat of claim 3 wherein said metal fibers have an average length to diameter ratio of at least 30:1.

7. The mat of claim 2 wherein said nickel fibers are produced by pyrolysis of nickel carbonyl.

8. The mat of claim 3 wherein said iron fibers are produced by pyrolysis of iron carbonyl.

* * * * *